(12) United States Patent
Ferguson et al.

(10) Patent No.: US 11,074,163 B2
(45) Date of Patent: Jul. 27, 2021

(54) METHOD AND SYSTEM FOR GENERATING UNIT TESTS USING MACHINE LEARNING

(71) Applicant: JPMorgan Chase Bank, N.A., New York, NY (US)

(72) Inventors: Derek Ferguson, Palos Park, IL (US); Xiangyang Wang, Naperville, IL (US); Klaudia Dziewulski, Chicago, IL (US); Luisa Garcia O'Toole, Chicago, IL (US); Karl T. Blatter, Arlington Heights, IL (US); Laura Schornack, Oak Park, IL (US); Shreyas Byndoor, Champaign, IL (US); August Gress, Indianola, IL (US); Sheev Modi, Champaign, IL (US); Benjamin Vonderheide, Tinley Park, IL (US); Rongzi Wang, Oak Grove, CA (US); Jiamin Zhu, Naperville, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/674,051

(22) Filed: Nov. 5, 2019

(65) Prior Publication Data
US 2021/0133084 A1    May 6, 2021

(51) Int. Cl.
*G06F 11/36*     (2006.01)
*G06N 3/04*      (2006.01)
*G06N 3/08*      (2006.01)

(52) U.S. Cl.
CPC ....... *G06F 11/3684* (2013.01); *G06N 3/0445* (2013.01); *G06N 3/08* (2013.01)

(58) Field of Classification Search
CPC ..... G06F 11/3684; G06N 3/0445; G06N 3/08
USPC .............................. 717/124–140; 706/45–60
See application file for complete search history.

(56) References Cited

U.S. PATENT DOCUMENTS

| | | | | |
|---|---|---|---|---|
| 5,629,878 A | * | 5/1997 | Kobrosly | G05B 13/028 702/120 |
| 6,820,072 B1 | * | 11/2004 | Skaanning | G06F 11/3608 706/52 |
| 6,980,975 B2 | * | 12/2005 | Reed | G01R 31/318357 706/47 |
| 7,386,521 B2 | * | 6/2008 | Adir | G06F 11/3684 706/14 |
| 7,406,451 B2 | * | 7/2008 | Mrziglod | G06N 3/08 706/20 |

(Continued)

OTHER PUBLICATIONS

Briand, "Novel Applications of Machine Learning in Software Testing", IEEE, pp. 3-10 (Year: 2008).*

(Continued)

*Primary Examiner* — Anil Khatri
(74) *Attorney, Agent, or Firm* — Greenblum & Bernstein, P.L.C.

(57) ABSTRACT

A method for generating a new test for a set of software code is provided. The method includes accessing a plurality of existing unit tests; implementing a machine learning algorithm; determining intended objectives of the set of software code; selecting a subset of the plurality of existing unit tests based on the determined objectives and an output of the machine learning algorithm; and using the selected unit tests to automatically generate the new test.

14 Claims, 4 Drawing Sheets

(56) References Cited

U.S. PATENT DOCUMENTS

| | | | | |
|---|---|---|---|---|
| 8,015,143 B2* | 9/2011 | Estes | G06F 16/2425 | 706/52 |
| 8,027,806 B2* | 9/2011 | Swanson | G09B 7/02 | 702/182 |
| 8,037,010 B2* | 10/2011 | Jaros | G06N 3/049 | 706/62 |
| 8,166,459 B2* | 4/2012 | Suenbuel | G06F 21/577 | 717/124 |
| 8,660,973 B1* | 2/2014 | Feigenbaum | G06N 5/02 | 706/47 |
| 8,799,869 B2* | 8/2014 | Grechanik | G06F 11/3676 | 717/126 |
| 8,875,092 B2* | 10/2014 | Gupta | G06F 11/3664 | 717/102 |
| 8,924,938 B2* | 12/2014 | Chang | G06F 11/3688 | 717/128 |
| 8,935,654 B2* | 1/2015 | Sengupta | G06F 11/3684 | 717/101 |
| 9,507,699 B2* | 11/2016 | Provost | G06F 11/3684 | |
| 10,162,741 B2* | 12/2018 | Kochura | G06F 11/3664 | |
| 10,572,374 B2* | 2/2020 | Sharma | G06N 20/00 | |
| 10,685,286 B1* | 6/2020 | McDonnell | G06N 3/04 | |

OTHER PUBLICATIONS

Masuda et al, "Survey of Software Quality for Machine Learning Applications", IEEE, pp. 279-284 (Year: 2018).*

Nakajima, [Invited] Quality Assurance of Machine Learning Software, IEEE, 601-604 (Year: 2018).*

Huang et al, "A Machine Learning Approach for Tracing Regulatory Codes to Product Specific Requirements", ACM, pp. 155-164 (Year: 2010).*

Allamanis, "The Adverse Effects of Code Duplication in Machine Learning Models of Code", ACM, pp. 143-153 (Year: 2019).*

Gupta et al, "Method to Predict Diagnostic Codes for Chronic Diseases using Machine Learning Techniques", IEEE, pp. 281-287 (Year: 2016).*

Shabtai et al, "Automated Static Code Analysis for Classifying Android Applications Using Machine Learning", IEEE, pp. 329-333 (Year: 2010).*

Pecorelli et al, "Comparing Heuristic and Machine Learning Approaches for Metric-Based Code Smell Detection", IEEE, pp. 93-104 (Year: 2019).*

\* cited by examiner

METHOD AND SYSTEM FOR GENERATING UNIT TESTS USING MACHINE LEARNING

BACKGROUND

1. Field of the Disclosure

This technology generally relates to methods and systems for generating tests for software code, and more particularly to methods and systems for automatically generating unit tests for newly developed code by using machine learning in conjunction with a set of existing unit tests.

2. Background Information

Software development is an essential function that is performed in the normal course of business for many organizations. Typically, software development is performed by individuals, such as computer programmers, engineers, and/or coders, who are tasked with generating software code that is designed to execute a particular function.

The generation of software code requires that the code be written, and then tested to ensure that an intended application is being properly executed by the code and that any errors in the code may be identified and corrected. In many instances, the testing process may be quite detailed and extensive. Once the code has been written and tested, it may then be implemented into an architecture to interact with other software modules.

The process of testing software modules involves generating a set of unit tests that are designed to show how respective units or modules of the software are functioning. Further, the number of unit tests that is needed for a particular set of code may be quite large, depending on the complexity of the application for which the code is being generated. In this aspect, the generation of the tests is a task unto itself, and as such, the generation of a set of unit tests can be tedious and time-consuming.

Accordingly, there is a need for a mechanism for automatically creating unit tests that are suitable for improving efficiencies in the software development process.

SUMMARY

The present disclosure, through one or more of its various aspects, embodiments, and/or specific features or sub-components, provides, inter alia, various systems, servers, devices, methods, media, programs, and platforms for automatically generating unit tests for newly developed software code by using machine learning in conjunction with a set of existing unit tests.

According to an aspect of the present disclosure, a method for generating a new test for a set of software code is provided. The method is implemented by at least one processor. The method includes accessing, by the at least one processor, a plurality of existing unit tests; determining, by the at least one processor, at least one intended objective of the set of software code; selecting, by the at least one processor, at least one unit test from among the plurality of existing unit tests based on the determined at least one intended objective; and using, by the at least one processor, the selected at least one unit test to automatically generate the new test.

The method may further include implementing, by the at least one processor, at least one machine learning algorithm. The selecting the at least one unit test from among the plurality of existing unit tests based on the determined at least one intended objective may be performed based on an output of the implemented at least one machine learning algorithm.

The method may further include generating, by the at least one processor, a model that is based on the plurality of existing unit tests; selecting, by the at least one processor, the at least one unit test by analyzing the determined at least one intended objective with respect to the model; and modifying, by the at least one processor after the new test is generated, the model based on the generated new test.

The modifying the model may include training the model by using the implemented at least one machine learning algorithm with respect to the generated new test and the plurality of existing unit tests.

The using the selected at least one unit test to generate the new test may include modifying the selected at least one unit test based on the determined at least one intended objective.

The using the selected at least one unit test to generate the new test may be performed based on at least one recurrent neural network (RNN).

The method may further include generating, by the at least one processor, information that relates to identifying a testing requirement that corresponds to the set of software code.

The method may further include determining, by the at least one processor, whether the automatically generated new test is a valid test.

The determining whether the new test is a valid test may be performed based on a PIT testing protocol.

The determining whether the automatically generated new test is a valid test may include obtaining a numerical rating value that relates to a validity of the new test.

According to another aspect of the present disclosure, a computing apparatus for implementing an execution of a method for generating a new test for a set of software code is provided. The computing apparatus includes a processor, a memory, and a communication interface coupled to each of the processor and the memory. The processor is configured to: access a plurality of existing unit tests from the memory; determine at least one intended objective of the set of software code; select at least one unit test from among the plurality of existing unit tests based on the determined at least one intended objective; and use the selected at least one unit test to automatically generate the new test.

The processor may be further configured to: implement at least one machine learning algorithm; and select the at least one unit test from among the plurality of existing unit tests based on an output of the implemented at least one machine learning algorithm.

The processor may be further configured to: generate a model that is based on the plurality of existing unit tests; select the at least one unit test by analyzing the determined at least one intended objective with respect to the model; and modify, after the new test is generated, the model based on the generated new test.

The processor may be further configured to train the model by using the implemented at least one machine learning algorithm with respect to the generated new test and the plurality of existing unit tests.

The processor may be further configured to generate the new test by modifying the selected at least one unit test based on the determined at least one intended objective.

The processor may be further configured to use the selected at least one unit test to generate the new test based on at least one recurrent neural network (RNN).

The processor may be further configured to generate information that relates to identifying a testing requirement that corresponds to the set of software code.

The processor may be further configured to determine whether the automatically generated new test is a valid test.

The processor may be further configured to determine whether the new test is a valid test based on a PIT testing protocol.

The processor may be further configured to obtain a numerical rating value that relates to a validity of the new test.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
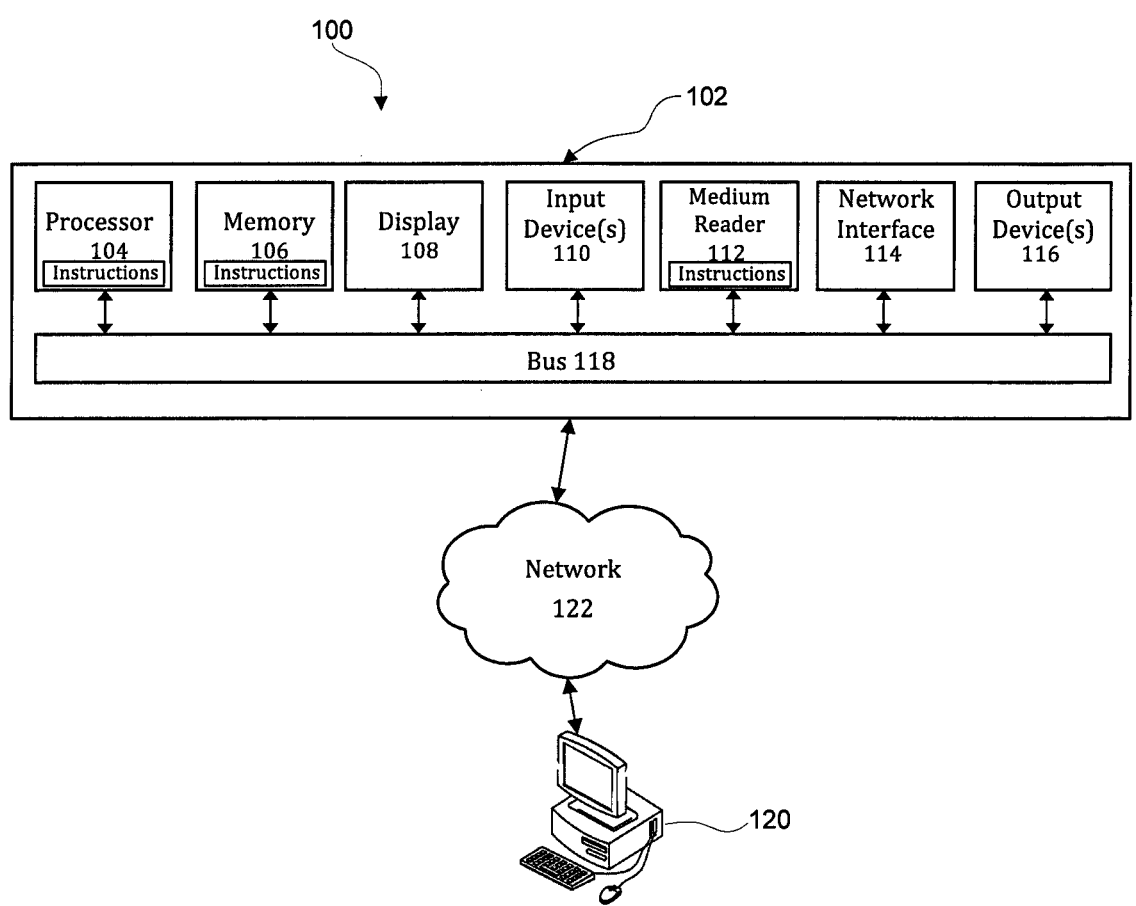
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, a wireless technology standard for exchanging data such as Bluetooth®, a specification for high-level communication protocols such as Zigbee®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically generating unit tests for newly developed software code by using machine learning in conjunction with a set of existing unit tests.

Figure 2:
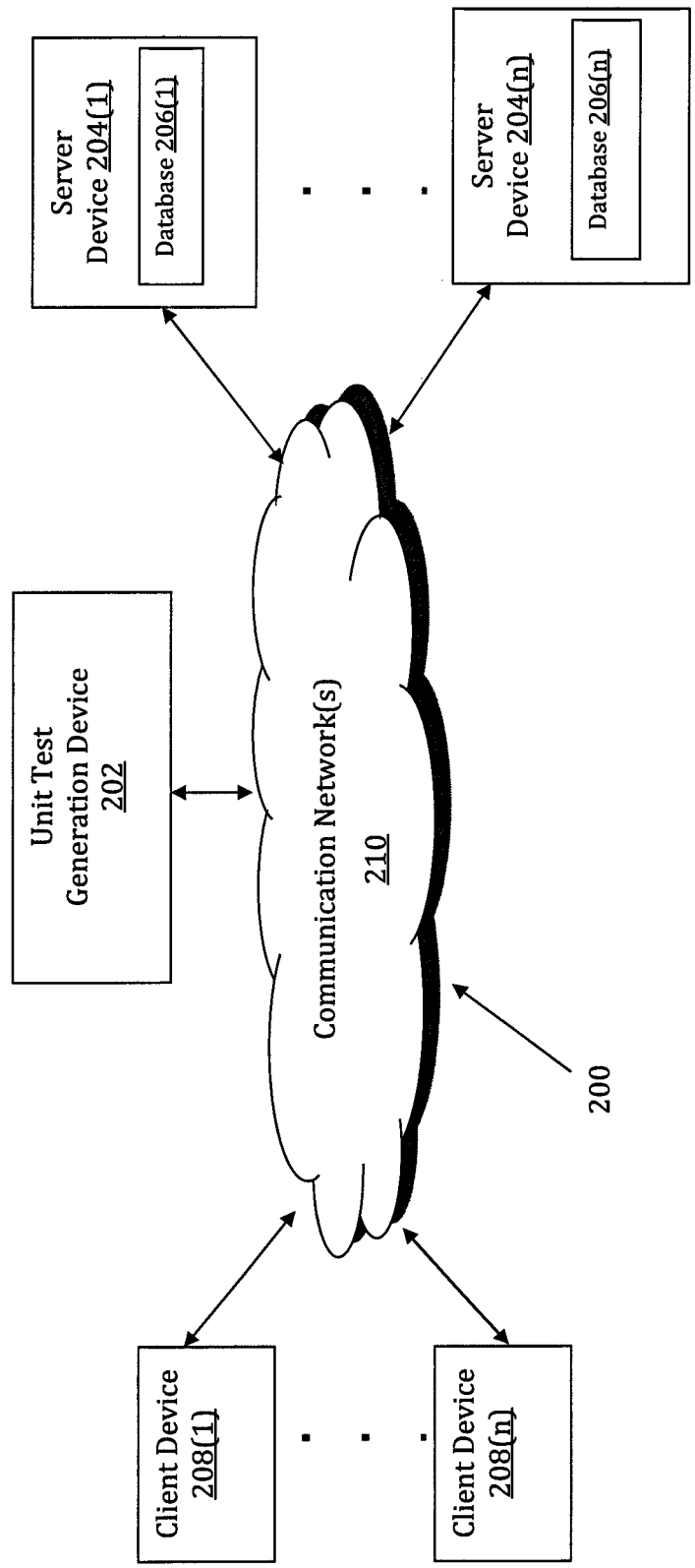
FIG. 2 illustrates an exemplary diagram of a network environment.

Referring to FIG. 2, a schematic of an exemplary network environment 200 for implementing a method for automatically generating unit tests for newly developed software code by using machine learning in conjunction with a set of existing unit tests is illustrated. In an exemplary embodiment, the method is executable on any networked computer platform, such as, for example, a personal computer (PC).

The method for automatically generating unit tests for newly developed software code by using machine learning in conjunction with a set of existing unit tests may be implemented by a Unit Test Generation (UTG) device 202. The UTG device 202 may be the same or similar to the computer system 102 as described with respect to FIG. 1. The UTG device 202 may store one or more applications that can include executable instructions that, when executed by the UTG device 202, cause the UTG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the UTG device 202 itself, may be located in virtual server(s) running in a cloud-based computing environment rather than being tied to one or more specific physical network computing devices. Also, the application(s) may be running in one or more virtual machines (VMs) executing on the UTG device 202. Additionally, in one or more embodiments of this technology, virtual machine(s) running on the UTG device 202 may be managed or supervised by a hypervisor.

In the network environment 200 of FIG. 2, the UTG device 202 is coupled to a plurality of server devices 204(1)-204(n) that hosts a plurality of databases 206(1)-206(n), and also to a plurality of client devices 208(1)-208(n) via communication network(s) 210. A communication interface of the UTG device 202, such as the network interface 114 of the computer system 102 of FIG. 1, operatively couples and communicates between the UTG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the UTG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and UTG devices that efficiently implement a method for automatically generating unit tests for newly developed software code by using machine learning in conjunction with a set of existing unit tests.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UTG device 202 may be a standalone device or integrated with one or more other devices or apparatuses, such as one or more of the server devices 204(1)-204(n), for example. In one particular example, the UTG device 202 may include or be hosted by one of the server devices 204(1)-204(n), and other arrangements are also possible. Moreover, one or more of the devices of the UTG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the UTG device 202 via the communication network(s) 210 according to the HTTP-based protocol and/or an open standard file format protocol such as JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to existing code, existing unit tests, and a unit test training model.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the UTG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the UTG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the UTG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the UTG device 202, the server devices 204(1)-204(n), or the client devices 208(1)-208(n), for example, may be configured to operate as virtual instances on the same physical machine. In other words, one or more of the UTG device 202, the server devices 204(1)-204(n), or the client devices 208(1)-208(n) may operate on the same physical device rather than as separate devices communicating through communication network(s) 210. Additionally, there may be more or fewer UTG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
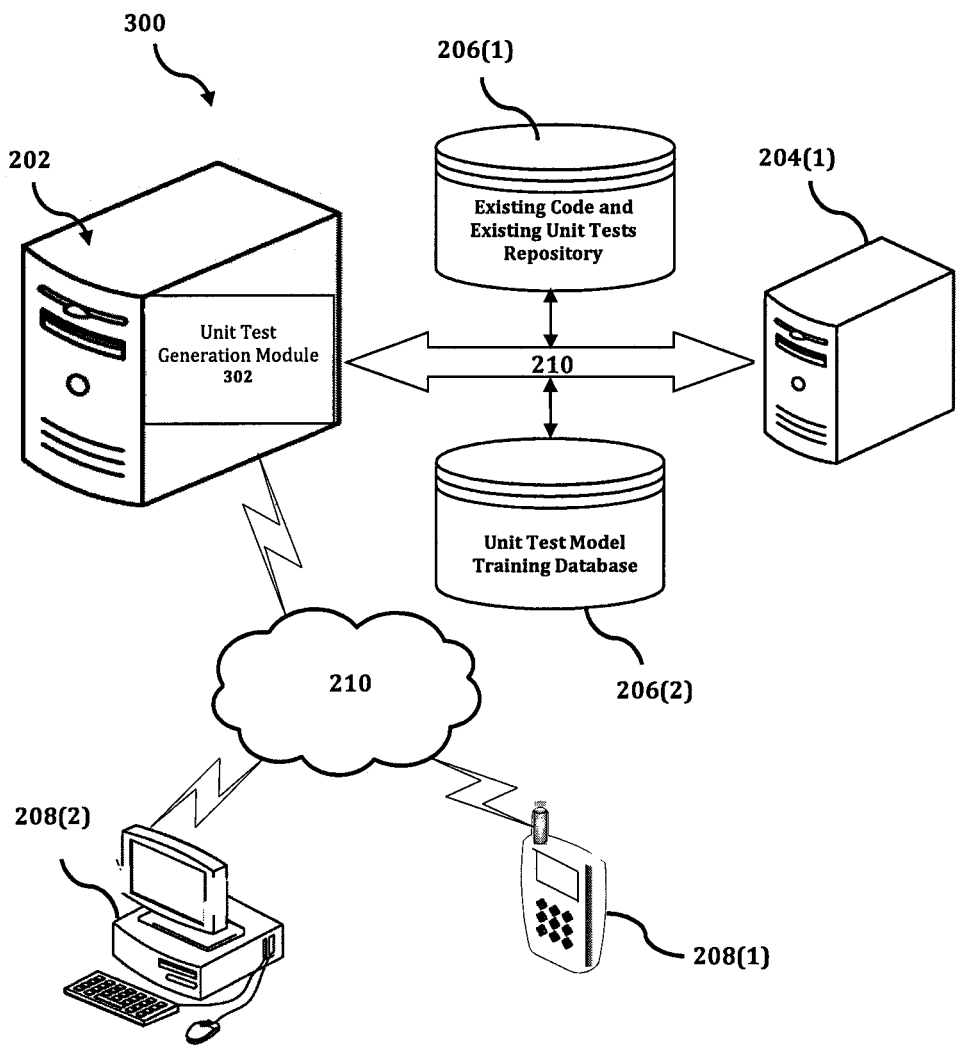
FIG. 3 shows an exemplary system for implementing a method for automatically generating unit tests for newly developed software code by using machine learning in conjunction with a set of existing unit tests.

The UTG device 202 is described and shown in FIG. 3 as including a unit test generation module 302, although it may include other rules, policies, modules, databases, or applications, for example. As will be described below, the unit test generation module 302 is configured to implement a method for automatically generating unit tests for newly developed software code by using machine learning in conjunction with a set of existing unit tests.

An exemplary process 300 for implementing a mechanism for automatically generating unit tests for newly developed software code by using machine learning in conjunction with a set of existing unit tests by utilizing the network environment of FIG. 2 is shown as being executed in FIG. 3. Specifically, a first client device 208(1) and a second client device 208(2) are illustrated as being in communication with UTG device 202. In this regard, the first client device 208(1) and the second client device 208(2) may be "clients" of the UTG device 202 and are described herein as such. Nevertheless, it is to be known and understood that the first client device 208(1) and/or the second client device 208(2) need not necessarily be "clients" of the UTG device 202, or any entity described in association therewith herein. Any additional or alternative relationship may exist between either or both of the first client device 208(1) and the second client device 208(2) and the UTG device 202, or no relationship may exist.

Further, UTG device 202 is illustrated as being able to access an existing code and existing unit tests repository 206(1) and a unit test model training database 206(2). The unit test generation module 302 may be configured to access these databases for implementing a method for automatically generating unit tests for newly developed software code by using machine learning in conjunction with a set of existing code (also referred to herein as "code under test") and a set of existing unit tests.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the UTG device 202 via broadband or cellular communication. Of course, these embodiments are merely exemplary and are not limiting or exhaustive.

Upon being started, the unit test generation module 302 executes a process for automatically generating unit tests for newly developed software code by using machine learning in conjunction with a set of existing unit tests. An exemplary process for automatically generating unit tests for newly developed software code by using machine learning in conjunction with a set of existing unit tests is generally indicated at flowchart 400 in FIG. 4.

Figure 4:
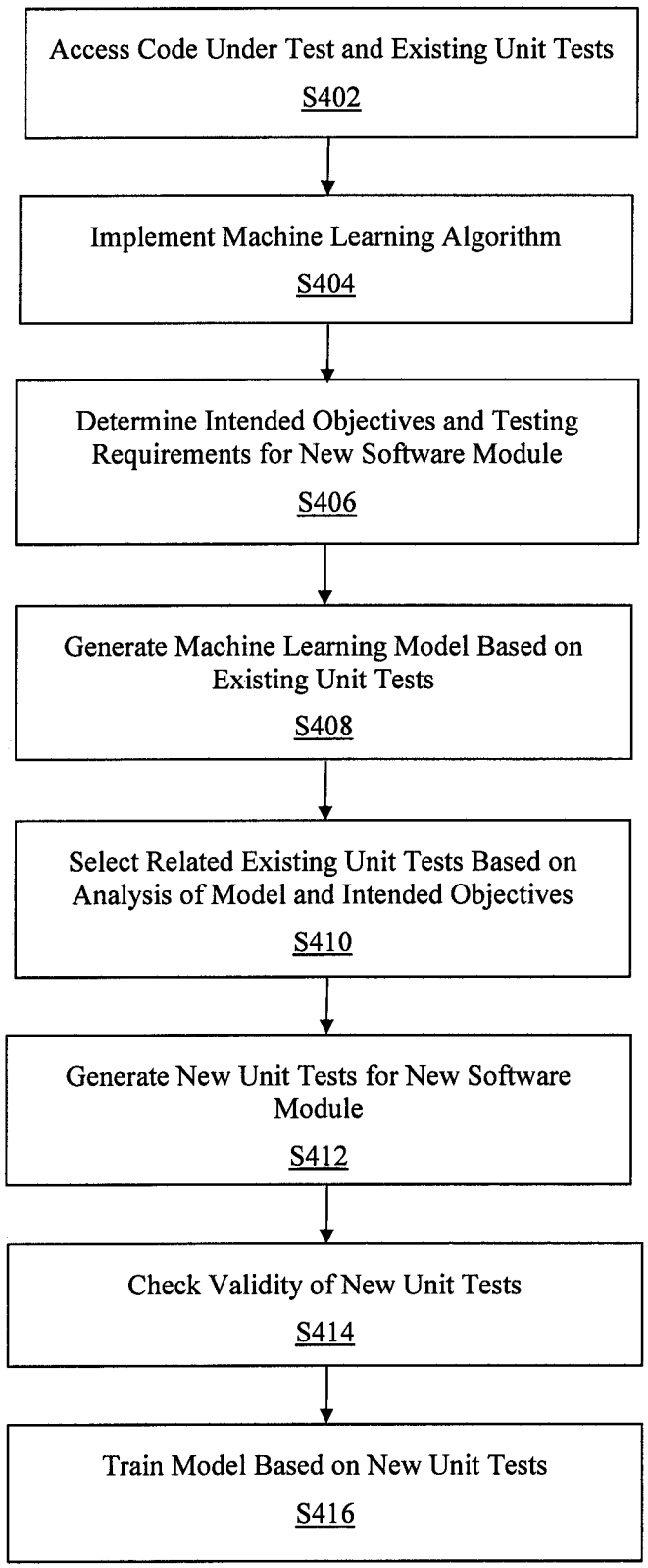
FIG. 4 is a flowchart of an exemplary process for implementing a method for automatically generating unit tests for newly developed software code by using machine learning in conjunction with a set of existing unit tests.

In process 400 of FIG. 4, at step S402, a set of existing code (also referred to herein as "code under test") and an existing set of unit tests are accessed. In an exemplary embodiment, the existing code and the existing set of unit tests may be stored in an archive, such as, for example, the existing code and existing unit tests repository 206(1). In this aspect, this archive may be cumulative and ever-increasing, i.e., whenever new code and/or a new unit test is created, the newly created code and/or unit test may be added to the archive, thereby providing a robust basis for the generation of subsequent unit tests and for the application of machine learning techniques with respect to the archive.

At step S404, a machine learning algorithm is implemented. The purpose of the machine learning algorithm is to use the existing set of unit tests as historical data in order to provide a roadmap for automatically generating new unit tests.

At step S406, one or more intended objectives for a new software module are determined, and one or more testing requirements for the new software module are also determined. In this aspect, whenever a new piece of software code is in development, the purpose of the new software entails achieving at least one objective. The intended objectives may correspond to testing requirements that may be critical for creating a new unit test.

At step S408, a machine learning model is generated based on the existing unit tests. The machine learning model acts as a framework for subsequent generation of new unit tests, and may be continually modified, enhanced, and/or updated by the introduction of subsequently created unit tests.

At step S410, at least one existing unit test is selected for a purpose of creating a new unit test based on an analysis of the machine learning model and the intended objectives of the new software as determined in step S406. The selection may be based in part on an output of the machine learning algorithm implemented in step S404. In this aspect, the selection of relevant existing unit tests may provide a template for the creation of a new unit test.

At step S412, one or more new unit tests for the new software module is automatically generated. In an exemplary embodiment, the unit test generation module 302 automatically generates a new unit test by using the existing unit tests selected in step S410, the intended objectives and testing requirements as determined in step S406, and a result of applying the machine learning algorithm and the machine learning model. In an exemplary embodiment, the generation of the new unit test may be performed based on at least one recurrent neural network (RNN).

At step S414, once the new unit tests have been generated, the newly generated unit tests are checked for validity, i.e., whether each new test serves as a valid test for the intended objectives and/or the testing requirements determined in step S406. In an exemplary embodiment, the validity check may be performed based on a PIT testing protocol. In an exemplary embodiment, the validity check may be performed by obtaining a numerical rating that indicates validity.

At step S416, the machine learning model is trained by using the newly generated unit tests in conjunction with the existing unit tests and the machine learning algorithm. In an exemplary embodiment, the ongoing training of the machine learning model contributes to the robustness of the model, thereby providing a self-perpetuating mechanism for improving the quality of subsequently generated unit tests.

Accordingly, with this technology, an optimized process for automatically generating unit tests for newly developed software code by using machine learning in conjunction with a set of existing unit tests is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a new test for a set of software code, the method being implemented by at least one processor, the method comprising:
   accessing, by the at least one processor, a plurality of existing unit tests;
   implementing, by the at least one processor, at least one machine learning algorithm;
   determining, by the at least one processor, at least one intended objective of the set of software code;
   generating, by the at least one processor, a model that is based on the plurality of existing unit tests;
   selecting, by the at least one processor, at least one unit test from among the plurality of existing unit tests based on analyzing the determined at least one intended objective with respect to the model and based on an output of the at least one machine learning algorithm;
   using, by the at least one processor, the selected at least one unit test to automatically generate the new test; and
   modifying, by the at least one processor after the new test is generated, the model based on the generated new test.

2. The method of claim 1, wherein the using the selected at least one unit test to generate the new test comprises modifying the selected at least one unit test based on the determined at least one intended objective.

3. The method of claim 1, wherein the using the selected at least one unit test to generate the new test is performed based on at least one recurrent neural network (RNN).

4. The method of claim 1, further comprising generating, by the at least one processor, information that relates to identifying a testing requirement that corresponds to the set of software code.

5. The method of claim 1, further comprising determining, by the at least one processor, whether the automatically generated new test is a valid test.

6. The method of claim 5, wherein the determining whether the new test is a valid test is performed based on a PIT testing protocol.

7. The method of claim 5, wherein the determining whether the automatically generated new test is a valid test comprises obtaining a numerical rating value that relates to a validity of the new test.

8. A computing device configured to implement an execution of a method for generating a new test for a set of software code, the computing device comprising:
   a processor;
   a memory; and
   a communication interface coupled to each of the processor and the memory,
   wherein the processor is configured to:
   access a plurality of existing unit tests from the memory;
   implement at least one machine learning algorithm;
   determine at least one intended objective of the set of software code;
   generate a model that is based on the plurality of existing unit tests;
   select at least one unit test from among the plurality of existing unit tests based on analyzing the determined at least one intended objective with respect to the model and based on an output of the at least one machine learning algorithm;
   use the selected at least one unit test to automatically generate the new test; and
   modify, after the new test is generated, the model based on the generated new test.

9. The computing device of claim 8, wherein the processor is further configured to generate the new test by modifying the selected at least one unit test based on the determined at least one intended objective.

10. The computing device of claim 8, wherein the processor is further configured to use the selected at least one unit test to generate the new test based on at least one recurrent neural network (RNN).

11. The computing device of claim 8, wherein the processor is further configured to generate information that relates to identifying a testing requirement that corresponds to the set of software code.

12. The computing device of claim 8, wherein the processor is further configured to determine whether the automatically generated new test is a valid test.

13. The computing device of claim 12, wherein the processor is further configured to determine whether the new test is a valid test based on a PIT testing protocol.

14. The computing device of claim 13, wherein the processor is further configured to obtain a numerical rating value that relates to a validity of the new test.

* * * * *